US010308813B2

(12) United States Patent
Buri et al.

(10) Patent No.: US 10,308,813 B2
(45) Date of Patent: Jun. 4, 2019

(54) DRY MINERAL PIGMENT CONTAINING CALCIUM CARBONATE, AQUEOUS SUSPENSION CONTAINING SAID PIGMENT, AND THE USES THEREOF

(75) Inventors: Matthias Buri, Mätteliweg (CH); Rene Burkhalter, Cuno-Amiet-Str. (CH); Peter Haldemann, Hallwylergeg (CH)

(73) Assignee: Omya International AG, Oftringen (CH)

( * ) Notice: Subject to any disclaimer, the term of this patent is extended or adjusted under 35 U.S.C. 154(b) by 1845 days.

(21) Appl. No.: 11/597,703

(22) PCT Filed: Jun. 8, 2005

(86) PCT No.: PCT/IB2005/002408

§ 371 (c)(1), (2), (4) Date: Dec. 11, 2006

(87) PCT Pub. No.: WO2005/121257

PCT Pub. Date: Dec. 22, 2005

(65) Prior Publication Data

US 2008/0022901 A1 Jan. 31, 2008

(30) Foreign Application Priority Data

Jun. 11, 2004 (FR) .................................... 04 06320

(51) Int. Cl.

*C09C 1/02* (2006.01)
*C08L 27/06* (2006.01)

(52) U.S. Cl.

CPC .......... *C09C 1/021* (2013.01); *C01P 2004/61* (2013.01); *C01P 2004/62* (2013.01); *C01P 2006/12* (2013.01); *C01P 2006/22* (2013.01)

(58) Field of Classification Search

CPC ............................ C08F 220/28; C08F 230/08; C08F 290/062; D21H 17/69; D21H 19/62; C01P 2004/61; C01P 2004/62; C01P 2006/12; C01P 2006/22; C09C 1/021

USPC .................................. 424/687; 106/463, 464

See application file for complete search history.

(56) References Cited

U.S. PATENT DOCUMENTS

| | | | | |
|---|---|---|---|---|
| 4,212,674 | A * | 7/1980 | Strauch | 106/14.05 |
| 4,219,590 | A | 8/1980 | Shibazaki et al. | |
| 4,386,169 | A * | 5/1983 | Artur et al. | 523/200 |
| 4,927,618 | A * | 5/1990 | Mathur | C01F 11/183 106/464 |
| 5,043,017 | A * | 8/1991 | Passaretti | 106/465 |
| 6,083,317 | A * | 7/2000 | Snowden | C09C 1/024 106/464 |
| 6,342,100 | B1 * | 1/2002 | Nover et al. | 106/464 |
| 7,341,704 | B2 * | 3/2008 | Kasahara et al. | 423/419.1 |

FOREIGN PATENT DOCUMENTS

| | | | | |
|---|---|---|---|---|
| EP | 0 377 149 A | | 7/1990 | |
| FR | 2 407 216 A | | 5/1979 | |
| JP | WO 2003/042103 | * | 5/2003 | C01F 11/18 |
| WO | WO 97/08247 A | | 3/1997 | |
| WO | WO 97/14847 | | 4/1997 | |
| WO | WO 00/20336 A | | 4/2000 | |
| WO | WO 00/39222 A | | 7/2000 | |

* cited by examiner

*Primary Examiner* — Shuangyi Abu Ali

(74) *Attorney, Agent, or Firm* — Amster, Rothstein & Ebenstein LLP

(57) ABSTRACT

The invention concerns a process for manufacturing a dry mineral pigment containing a product formed in situ by the multiple reaction between a calcium carbonate and the product or products of reaction of the said carbonate with one or more moderately strong to strong H3O+ ion donators and the product or products of reaction of the said carbonate with gaseous $CO_2$ formed in situ and/or originating from an external supply and one or more compounds of formula R—X together with the mineral pigment obtained by the process, and its applications in the field of paint and/or plastics.

39 Claims, No Drawings

DRY MINERAL PIGMENT CONTAINING CALCIUM CARBONATE, AQUEOUS SUSPENSION CONTAINING SAID PIGMENT, AND THE USES THEREOF

This is a U.S. national phase of PCT Application No. PCT/IB2005/002408, filed Jun. 8, 2005 and claims priority to French Application No. 04/06320, filed Jun. 11, 2004.

The present invention concerns the technical sector of mineral fillers and concerns notably mineral pigments containing a dry product formed in situ by the multiple reaction between a calcium carbonate and the product or products of reaction of the said carbonate with one or more moderately strong to strong $H_3O^+$ ion donators and the product or products of reaction of the said carbonate with gaseous $CO_2$ formed in situ and/or originating from an external supply and one or more compounds of formula R—X, used in paint and/or plastic and/or coatings and/or mastics applications, particularly as a rheology regulating filler enabling the viscosity to be controlled whilst preserving the solidity of the polymer materials, and more particularly in the motor vehicle industry as an underbody protective covering.

The invention also concerns a process for manufacturing a dry mineral pigment containing a product formed in situ by the multiple reaction between a calcium carbonate and the product or products of reaction of the said carbonate with one or more moderately strong to strong $H_3O^+$ ion donators and the product or products of reaction of the said carbonate with gaseous $CO_2$ formed in situ and/or originating from an external supply and one or more compounds of formula R—X together with the mineral pigment obtained by the process.

This dry mineral pigment according to the invention may possibly before drying be put in aqueous suspension by means of an anionic electrolyte to obtain an aqueous anionic suspension of filler containing a product formed in situ by the multiple reaction between a calcium carbonate and the product or products of reaction of the said carbonate with one or more moderately strong to strong $H_3O^+$ ion donators and the product or products of reaction of the said carbonate with gaseous $CO_2$ formed in situ and/or originating from an external supply and one or more compounds of formula R—X.

This anionic aqueous suspension and the corresponding product after drying possibly contain one or more anionic electrolytes such as for example one or more dispersing agents.

This dry mineral pigment according to the invention may possibly before drying be put in aqueous suspension by means of an cationic electrolyte to obtain an aqueous cationic suspension of filler containing a product formed in situ by the multiple reaction between a calcium carbonate and the product or products of reaction of the said carbonate with one or more moderately strong to strong $H_3O^+$ ion donators and the product or products of reaction of the said carbonate with gaseous $CO_2$ formed in situ and/or originating from an external supply and one or more compounds of formula R—X.

This cationic aqueous suspension and the corresponding product after drying contain possibly one or more cationic electrolytes such as for example one or more dispersants.

This dry mineral pigment according to the invention may possibly before drying be put in aqueous suspension by means of a slightly anionic electrolyte to obtain a slightly aqueous anionic suspension of filler containing a product formed in situ by the multiple reaction between a calcium carbonate and the product or products of reaction of the said carbonate with one or more moderately strong to strong $H_3O^+$ ion donators and the product or products of reaction of the said carbonate with gaseous $CO_2$ formed in situ and/or originating from an external supply and one or more compounds of formula R—X.

This slightly anionic aqueous suspension and the corresponding product after drying contain possibly one or more slightly anionic electrolytes such as for example one or more dispersants.

The invention also concerns the use of the said dry mineral pigment and the said aqueous suspensions of mineral pigment, in the fields of paints and/or plastic and/or coatings and/or mastics, and particularly as a filler regulating the rheology of formulations of the plastisol and rigid polyvinyl chloride (PVC) type, and particularly as a filler enabling the viscosity to be controlled while preserving the solidity of the plastisol and rigid PVC formulations, and notably in rocker panel protective coatings for motor vehicles.

It also concerns plastisol and rigid PVC formulations and underbody protective covering containing the said dry mineral pigment.

Finally, it concerns paints and/or coatings and/or mastics containing the said dry mineral pigment.

The skilled man in the art, who is thus seeking to control the rheology of the formulations used in the manufacture of vehicle bodies whilst preserving the solidity of the polymers constituting them, is familiar with patent application WO 00/20336, which offers him a solution by selection of granulometry of the filler used, but this solution does not give him complete satisfaction.

He is also familiar with EP 377 149, the solution of which to improve rheology does not satisfy him either.

He is also familiar with FR 2 407 216, which proposes as agents intended to modify the rheological properties of the plastisols of phosphoric ester derivates constituted by the product of the neutralisation of an excess of esters obtained by esterification of phosphoric anhydride or polyphosphoric acid with an organic derivate having at least one hydroxyl group.

But all these documents do not enable the skilled man in the art to control the rheology of the formulations used in the manufacture of vehicle bodies whilst preserving the solidity of the polymers constituting them.

Continuing his research in order to control the rheology of the formulations used in motor vehicle bodies whilst preserving their solidity, the Applicant has found, in a surprising manner, that a dry mineral pigment containing a product formed in situ by the multiple reaction between a calcium carbonate and the product or products of reaction of the said carbonate with one or more moderately strong to strong H3O+ ion donators and the product or products of reaction of the said carbonate with gaseous $CO_2$ formed in situ and/or originating from an external supply and one or more compounds of formula R—X, enables the rheology to be regulated during plastisol formulation and the weight of the plastisol thus obtained to be reduced whilst preserving the solidity.

The Applicant has also developed a process for obtaining a dry mineral pigment containing a product formed in situ by the multiple reaction between a calcium carbonate and the product or products of reaction of the said carbonate with one or more moderately strong to strong H3O+ ion donators and the product or products of reaction of the said carbonate with gaseous $CO_2$ formed in situ and/or originating from an external supply and one or more compounds of formula R—X, enabling the abovementioned results to be obtained in underbody coverings and/or excellent abrasion resistance of aqueous paints.

One object of the invention is thus a dry mineral pigment containing a product formed in situ by the multiple reaction between a calcium carbonate and the product or products of reaction of the said carbonate with one or more moderately strong to strong H3O+ ion donators and the product or products of reaction of the said carbonate with gaseous $CO_2$ formed in situ and/or originating from an external supply and one or more compounds of formula R—X.

Another object of the invention is also a process for manufacturing the said dry pigment.

Another object of the invention concerns the aqueous suspension of the mineral pigment according to the invention.

Another object of the invention is the dry mineral pigment obtained by the process according to the invention together with its use in the fields of paints and/or plastic and/or coatings and/or mastics, and particularly as a filler to regulate the rheology of formulations of the plastisol and rigid polyvinyl chloride (PVC) type, and very particularly as a filler enabling the viscosity to be controlled whilst preserving the solidity of the polymers.

Another object of the invention is, more particularly, the use of the said dry mineral pigment and the said aqueous suspensions of mineral pigment, in the fields of paints and/or plastic and/or coatings and/or mastics, and particularly as a filler regulating the rheology of formulations of the plastisol and rigid polyvinyl chloride (PVC) type, and very particularly as a filler enabling the viscosity to be controlled while preserving the solidity of the plastisol and rigid PVC formulations, and notably in rocker panel protective coatings for motor vehicles.

Additionally, another object of the invention is the plastisol or rigid PVC formulation containing the mineral pigment according to the invention.

Finally, another object of the invention is the paint and/or mastic and/or coating formulation containing the mineral pigment according to the invention.

Thus, the dry mineral product according to the invention is characterised in that it contains a product formed in situ by the multiple reaction between a calcium carbonate and the product or products of reaction of the said carbonate with one or more moderately strong to strong H3O+ ion donators and the product or products of reaction of the said carbonate with gaseous $CO_2$ formed in situ and/or originating from an external supply and one or more compounds of formula R—X.

In a particular manner, the dry mineral pigment according to the invention is characterised in that the radical R of the compounds of formula R—X represents a carbonaceous radical, whether or not saturated, having 8 to 24 carbon atoms, such as the linear or ramified alkyl, alkylaryl, arylalkyl, aryl, polyaryl or again cyclic groups, or their mixtures, and in that the group X of the compound or compounds of formula R—X represents groups such as carboxylic, amine, hydroxyl, phosphonic, or their mixtures.

In an even more particular manner, compounds of the R—X type are chosen from among the fatty acids, the fatty amines, or the fatty alcohols, whether or not saturated, having preferentially 8 to 24 carbon atoms, such as notably of the stearic, oleic, linoleic, myristic, octylic type, or their own mixtures, and very preferentially 16 to 18 carbon atoms, or their mixtures with synthetic or natural fatty compounds, preferentially compounds of vegetal origin such as coconut oil or oil of animal origin such as tallow, and very preferentially of vegetal origin.

The dry mineral pigment according to the invention is characterised particularly in that the moderately strong to strong H3O+ ion donators are chosen from among the moderately strong to strong acids, or their mixtures, generating $H_3O^+$ ions, and are preferentially chosen from among acids having a $pK_a$ of less than or equal to 2.5 at 25° C.

In a very particular variant, the dry mineral pigment according to the invention is characterised in that the strong acids are chosen from among the acids having a $pK_a$ of less than or equal to 0 at 25° C., such as sulphuric acid, hydrochloric acid or their mixtures.

In another very particular variant, the dry mineral pigment according to the invention is characterised in that the moderately strong acid or acids are chosen from among the acids having a $pK_a$ of between 0 and 2.5 inclusive at 25° C. and more particularly chosen from among $H_2SO_3$, $HSO_4^-$, $H_3PO_4$, or their mixtures, and even more preferentially from among the moderately strong acids forming bivalent cation salts, such as calcium, which are almost insoluble in water, i.e. of solubility less than 1% by mass.

In a particular manner, the mineral pigment according to the invention is characterised in that the calcium carbonate is a natural calcium carbonate and in a very preferred manner this natural calcium carbonate is chosen from among a marble, a calcite, a chalk, a dolomite or their mixtures.

In an equally preferred manner, the dry mineral pigment according to the invention is characterised in that it has a specific surface area of between 1 $m^2/g$ and 200 $m^2/g$ measured according to the BET method, preferentially between 5 $m^2/g$ and 80 $m^2/g$ and very preferentially between 20 $m^2/g$ and 60 $m^2/g$, together with a median diameter, determined by a measurement using the Sedigraph™ 5100, of between 0.1 and 50 micrometer, and preferentially between 1 and 10 micrometer.

The dry mineral pigment according to the invention is characterized in that the moisture content is less than 1.5% after drying for 2 hours at 120° C. in an oven at atmospheric pressure.

The process according to the invention to manufacture a dry mineral pigment containing a product formed in situ by the multiple reaction between a calcium carbonate and the product or products of reaction of the said carbonate with one or more moderately strong to strong H3O+ ion donators and the product or products of reaction of the said carbonate with gaseous $CO_2$ formed in situ and/or originating from an external supply and one or more compounds of formula R—X is characterised in that it comprises the following stages:

a) Treatment of the calcium carbonate in aqueous phase with the moderately strong to strong H3O+ ion donators and treatment with gaseous $CO_2$ formed in situ, a treatment which is an integral part of stage a), b) Treatment of calcium carbonate in aqueous phase with the compound or compounds of formula R—X, consisting in the addition, before and/or during and/or after stage a), of one or more compounds of formula R—X, and more particularly of the compound or compounds of type R—X chosen from among the fatty acids, the fatty amines, or the fatty alcohols, whether or not saturated, having preferentially 8 to 24 carbon atoms such as, notably, of the stearic, oleic, linoleic, myristic, octylic type, or their own mixtures, and very preferentially 16 to 18 carbon atoms, or their mixtures, with synthetic or natural fatty compounds, preferentially compounds of vegetal origin such as coconut oil, or of animal origin, such as tallow, and very preferentially of vegetal origin, c) possibly forming an anionic or cationic aqueous or slightly anionic suspension of the product obtained in stage b) at a dry matter concentration of between 1% and 80%, possibly using at least one anionic or cationic or slightly anionic electrolyte, possibly followed by a reconcentration, d) possibly the addition of a base, preferably $Ca(OH)_2$, in order to increase the pH above 6, and preferably above 7.5, and more particularly to a value of between 8 and 10, e) drying after one of the stages b), c) or d).

It should be noted that this drying stage e) is undertaken by all drying methods which are very familiar to the skilled man in the art.

In a particular manner, the process according to the invention is characterised in that the calcium carbonate is a natural calcium carbonate and in a very preferred manner this natural calcium carbonate is chosen from among a marble, a calcite, a chalk, a dolomite or their mixtures.

In a more particular manner, the process according to the invention is characterised is that the moderately strong to strong H3O+ ion donators are chosen from among any moderately strong to strong acid, or any mixture of such acids, generating $H_3O^+$ ions under the treatment conditions.

According to the invention, the mole quantity of moderately strong to strong H3O+ ion donators relative to the number of moles of $CaCO_3$ is in total between 0.001 and 1, and preferentially between 0.1 and 0.5.

According to the invention, the mole quantity of compounds of R—X type relative to the number of moles of $CaCO_3$ is in total between 0.0001 and 0.1, and preferentially between 0.002 and 0.01.

According to a preferred embodiment, stage a) can be repeated several times and the order of addition of the moderately strong and strong acids is of no importance with an addition of compounds of R—X type, before and/or during and/or after the moderately strong or strong acids.

According to a preferred embodiment, stage b) may be repeated several times.

Similarly, according to a preferred embodiment, the temperature during stage a) of the process is between 5° C. and 100° C., and preferentially between 65° C. and 80° C.

In an equally preferred manner, the duration of stage a) of the process lasts between 0.01 hours and 10 hours, and preferentially between 0.2 hours and 6 hours.

The treatment process according to the invention is used in an aqueous phase in low, moderately strong or strong dry matter concentrations, but may also be used for mixtures of suspensions constituted by these various concentrations. In a preferential manner, the dry matter content is between 1% and 80% by weight.

In a particular manner a variant of stage c) uses 0.01% to 5.0% by dry weight of an anionic electrolyte chosen from among the homopolymers or copolymers at the non-neutralised, partially neutralised or totally neutralised acid state, of monomers with ethylenic unsaturation and with a monocarboxylic function, such as acrylic or methacrylic acid, or again the diacid hemiesters such as the $C_1$ to $C_4$ mono-esters of the maleic or itaconic acids, or their mixtures, or with a dicarboxylic function chosen from among the monomers with ethylenic unsaturation, and di carboxylic function, such as crotonic, isocrotonic, cinnamic, itaconic or maleic acid, or again the anhydrides of carboxylic acids, such as maleic anhydride, or with a sulphonic function chosen from among the monomers with ethylenic unsaturation and with sulphonic function such as acrylamido-methyl-propane-sulphonic acid, sodium methallylsulfonate, vinyl sulphonic acid and styrene sulphonic acid, or again with a phosphoric function chosen from among the monomers with ethylenic unsaturation and with phosphoric function such as vinyl phosphoric acid, ethylene glycol methacrylate phosphate, propylene glycol methacrylate phosphate, ethylene glycol acrylate phosphate, propylene glycol acrylate phosphate and their ethoxylates, or again with phosphonic function chosen from among the monomers with ethylenic unsaturation and with phosphonic function, such as phosphonic vinyl acid, or their mixtures, or again the polyphosphates.

Similarly, a variant of stage c) uses, in a particular manner, between 0.01% and 5.0% by dry weight of a cationic electrolyte chosen from among the homopolymers or copolymers of the cationic monomers or quaternary ammonium with ethylenic unsaturation such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, or [3-(methacrylamido)propyl]trimethyl ammonium chloride or sulphate.

Similarly, a variant of stage c) uses, in a particular manner, between 0.01% and 5.0% by dry weight of a slightly anionic electrolyte chosen from among the slightly ionic and water soluble copolymers comprising:

a) at least one anionic monomer with a carboxylic or dicarboxylic or phosphoric or phosphonic or sulphonic function, or their mixtures, b) at least one non-ionic monomer, where the non-ionic monomer consists of at least one monomer of formula (I):

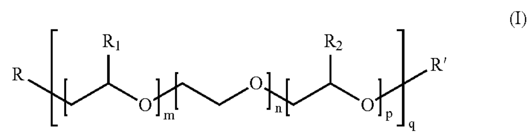

(I)

where:

m and p represent a number of alkylene oxide units of less than or equal to 150, n represents a number of ethylene oxide units of less than or equal to 150, q represents a whole number at least equal to 1 and such that $5 \leq (m+n+p)q \leq 150$, and preferentially such that $15 \leq (m+n+p)q \leq 120$ $R_1$ represents hydrogen or the methyl or ethyl radical, $R_2$ represents hydrogen or the methyl or ethyl radical, R represents a radical containing an unsaturated polymerisable function, preferentially belonging to the group of vinylics, or to the group of acrylic, methacrylic, maleic, itaconic, crotonic, vinylphthalic esters, or to the group of unsaturated urethanes such as, for example, acrylurethane, methacrylurethane, α-α' dimethyl-isopropenyl-benzylurethane, allylurethane, or to the group of allylic or vinylic ethers, whether or not substituted, or again to the group of ethylenically unsaturated amides or imides, R' represents hydrogen or a hydrocarbonate radical having 1 to 40 carbon atoms, and represents preferentially a hydrocarbonate radical having 1 to 12 carbon atoms, and very preferentially a hydrocarbonate radical having 1 to 4 carbon atoms, or a mixture of several monomers of formula (I), c) possibly at least one monomer of the acrylamide or methacrylamide type, or their derivates such as N-[3-(dimethylamino)propyl]acrylamide or N-[3-(dimethylamino)propyl]methacrylamide, and their mixtures, or again of at least one non-water soluble monomer such as the alkyl acrylates or methacrylates, the unsaturated esters such as N-[2-(dimethylamino)ethyl]methacrylate, or N-[2-(dimethylamino)ethyl]acrylate, the vinylics such as vinyl acetate, vinylpyrrolidone, styrene, alphamethylstyrene and their derivates, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or again at least one organofluorate or organosilylated monomer, or a mixture of several of these monomers, d) possibly at least one monomer having at least two ethylenic unsaturations called in the remainder of the application a grafting monomer The dry mineral pigment containing a product formed in situ according to the invention is characterised in that it is obtained by the process according to the invention.

In a more particular manner, the mineral pigment containing a product formed in situ according to the invention is characterised in that it has a specific surface area of between 1 $m^2/g$ and 200 $m^2/g$ measured according to the BET method, preferentially between 5 $m^2/g$ and 80 $m^2/g$ and very preferentially between 20 $m^2/g$ and 60 $m^2/g$, together with a median diameter, determined by a measurement using the Sedigraph™ 5100, of between 0.1 and 50 micrometer, and preferentially between 1 and 10 micrometer.

The BET specific surface area is determined using method ISO 9277.

In another variant, the aqueous suspension of mineral pigment obtained according to stages c) to d) is characterised in that the mineral pigment has a specific surface area of between 1 $m^2/g$ and 200 $m^2/g$ measured using the BET method, preferentially between 5 $m^2/g$ and 80 $m^2/g$ and very preferentially between 10 $m^2/g$ and 60 $m^2/g$, together with a median diameter, determined by a measurement using the Sedigraph™ 5100, of between 0.1 and 50 micrometer, and preferentially of between 1 and 10 micrometer, and in that the suspension has a dry matter content of between 1% and 80% and in that it contains between 0.05% and 5.0% by dry weight, relative to the dry weight of calcium carbonate, of at least one anionic electrolyte.

This anionic electrolyte is chosen from among the anionic electrolytes mentioned above.

In an equally more particular manner, the aqueous suspension of mineral pigment obtained according to stages c) to d) is characterised in that the mineral pigment has a specific surface area of between 1 $m^2/g$ and 200 $m^2/g$ measured using the BET method, preferentially between 5 $m^2/g$ and 80 $m^2/g$ and very preferentially between 20 $m^2/g$ and 60 $m^2/g$, together with a median diameter, determined by a measurement using the Sedigraph™ 5100, of between 0.1 and 50 micrometer, and preferentially of between 1 and 10 micrometer, and in that the suspension has a dry matter content of between 1% and 80% and in that it contains between 0.1% and 5.0% by dry weight, relative to the dry weight of calcium carbonate, of at least one cationic electrolyte.

This cationic electrolyte is chosen from among the cationic electrolytes mentioned above.

In another particular variant, the aqueous suspension of mineral pigment obtained according to stages c) to d) is characterised in that the mineral pigment has a specific surface area of between 1 $m^2/g$ and 200 $m^2/g$ measured using the BET method, preferentially between 5 $m^2/g$ and 80 $m^2/g$ and very preferentially between 20 $m^2/g$ and 60 $m^2/g$, together with a median diameter, determined by a measurement using the Sedigraph™ 5100, of between 0.1 and 50 micrometer, and preferentially of between 1 and 10 micrometer, and in that the suspension has a dry matter content of between 0.3% and 80% and preferably in that it contains between 15% and 60% by dry weight, relative to the dry weight of calcium carbonate, of at least one slightly anionic electrolyte.

In an even more preferred manner, the aqueous suspension according to the invention is characterised in that the mineral pigment has a specific surface area of between 1 $m^2/g$ and 80 $m^2/g$ and very preferentially between 10 $m^2/g$ and 60 $m^2/g$, together with a median diameter, determined by a measurement using the Sedigraph™ 5100, of between 0.1 and 50 micrometer, and preferentially between 1 and 10 micrometer, The invention thus also concerns the use of the suspension of mineral pigment according to the invention as a filler regulating rheology enabling the viscosity to be controlled whilst conserving the solidity of formulations of the plastisol and rigid PVC type, and more particularly the use in the motor vehicle industry in formulations for underbody protective coverings.

It also concerns the use of the suspension of mineral pigment according to the invention in the fields of paint and/or coatings and/or mastics.

The underbody protective covering according to the invention is characterised in that it contains the mineral filler according to the invention after drying in quantities of between 0.05% to 50%, and preferentially between 1% to 20%, and more preferentially between 5% and 15%.

The following examples illustrate the invention without however limiting its scope.

EXAMPLE 1

This example illustrates the prior art and concerns the various processes for preparing pigment according to the prior art.

Test n° 1

This test illustrates a process for preparing a pigment according to the prior art for which 0.5 kg, calculated as dry pigment, of natural calcium carbonate of the Norwegian marble type, of granulometry such that 65% by weight of the particles have a diameter of less than 1 μm, measured using the Sedigraph™ 5100 of the company Micromeritics, in the form of an aqueous suspension of 75% of dry content, dispersed with 0.6% of a soda polyacrylate, is diluted until an aqueous suspension with a 15% by weight dry matter concentration is obtained, using distilled water, in the 10-litre container. The suspension thus formed is then treated with 10% of phosphoric acid in a 10% by weight solution, at 65° C. whilst stirring, for 20 minutes, at 500 rpm. The pH was then adjusted, to between 8 and 8.5, with a suspension of lime at a concentration equal to 10% by dry weight, before drying the suspension obtained using a Nara MSD 100 drying machine.

The suspension of mineral pigment obtained before drying has a dry pigment concentration equal to 18.8% by mass, and a pH equal to 8.4.

The granulometry measured using a Sedigraph™ 5100 is such that 90% by weight of the particles have a diameter of less than 2 μm and 57% by weight of the particles have a diameter of less than 1 μm.

After drying, the product has a BET specific surface area, measured using the BET method of norm ISO 9277 equal to 30.7 $m^2/g$.

Test n° 2

This test illustrates a process for preparing a pigment according to the prior art for which 0.758 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 75% of dry content, dispersed with 0.6% of a soda polyacrylate, is diluted until an aqueous suspension with a 10% by weight dry matter concentration is obtained, using distilled water, in the 10-litre ESCO reactor. The suspension thus formed is then treated with 20% of phosphoric acid in a 20% by weight solution, at 65° C. whilst stirring, for 60 minutes. The pH was then adjusted, to between 8 and 8.5, with a suspension of lime at a concentration equal to 10% by dry weight, before drying the suspension obtained using a Nara MSD 100 drying machine.

The suspension of mineral pigment obtained before drying has a dry pigment concentration equal to 18.8% by mass, and a pH equal to 8.4.

The granulometry measured using a Sedigraph™ 5100 is such that 94.4% by weight of the particles have a diameter of less than 2 μm and 68.2% by weight of the particles have a diameter of less than 1 μm.

After drying, the product has a BET specific surface area, measured using the BET method of norm ISO 9277 equal to 31.1 $m^2/g$.

Test n° 3

This test illustrates a process for preparing a pigment according to the prior art for which 0.5 kg, calculated as dry pigment, of natural calcium carbonate of the Norwegian marble type, of granulometry such that 65% by weight of the particles have a diameter of less than 1 μm, measured using the Sedigraph™ 5100 of the company Micromeritics, in the form of an aqueous suspension of 75% of dry content, dispersed with 0.6% of a soda polyacrylate, is diluted until an aqueous suspension with a 15% by weight dry matter concentration is obtained, using distilled water, in the 10-litre container. The suspension thus formed is then treated with 10% of phosphoric acid in a 10% by weight solution, at 65° C. whilst stirring, for 20 minutes, at 500 rpm. The pH was then adjusted, to between 8 and 8.5, with a suspension of lime at a concentration equal to 10% by dry weight, before drying the suspension obtained using a Nara MSD 100 drying machine.

The suspension of mineral pigment obtained before drying has a dry pigment concentration equal to 18.8% by mass, and a pH equal to 8.4. The granulometry measured using a Sedigraph™ 5100 is such that 90% by weight of the particles have a diameter of less than 2 μm and 57% by weight of the particles have a diameter of less than 1 μm.

After drying, the product has a BET specific surface area, measured using the BET method of norm ISO 9277 equal to 30.7 $m^2/g$.

The product is then treated with 3% of stearic acid. The treatment was undertaken at 120° C. for ten minutes in a laboratory mixer from MTI; the rotational speed was 1500 rpm.

EXAMPLE 2

This example illustrates the invention and concerns the process for manufacturing a dry mineral pigment containing a product formed in situ by the multiple reaction between a natural calcium carbonate and the product or products of reaction of the said carbonate with one or more moderately strong to strong H3O+ ion donators and the product or products of reaction of the said carbonate with gaseous $CO_2$ formed in situ and/or originating from an external supply and one or more compounds of formula R—X together with the mineral pigment obtained by the process.

Test n° 4

This test illustrates the invention and concerns a process to obtain the pigment according to the invention in which the treatment with 2% of a mixture of palmitic acid and stearic acid (in a ratio of approximately 1/1 by weight) takes place during the reaction of the calcium carbonate with phosphoric acid.

To accomplish this, 0.746 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 78% of dry content, dispersed with 0.5% of a soda polyacrylate, is diluted until an aqueous suspension with a 10% by weight dry matter concentration is obtained, using distilled water, in a 10-litre ESCO reactor. The suspension thus formed is then treated with 25% of phosphoric acid in a solution 20% by weight, at 60° C. whilst stirring, for 60 minutes, at 500 rpm. 2% of fatty acid of the Palmitic Acid/Stearic Acid mixture type, in a ratio of 1/1 by weight, is then added as powder and mixed for 30 minutes before drying the suspension obtained using a Nara MSD-100 drying machine.

The suspension of mineral pigment obtained before drying has a dry pigment concentration equal to 9.5% by mass, and a pH equal to 6.4.

The granulometry measured using a Sedigraph™ 5100 is such that 90.9% of the particles have a diameter of less than 2 μm and 66.8% of the particles have a diameter of less than 1 μm.

After drying the product has a BET specific surface area, measured using the BET method of norm ISO 9277, equal to 33.4 $m^2/g$ and a median diameter, determined by a measurement using the Sedigraph™ 5100, equal to 0.72 micrometer, and a moisture content equal to 1.32% determined using the method described above.

Test n° 5

This test illustrates the invention and concerns a process to obtain pigment according to the invention in which the treatment with 2% of stearic acid takes place before the reaction of the calcium carbonate with the phosphoric acid.

To accomplish this, 0.750 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 78% of dry content, dispersed with 0.5% of a soda polyacrylate, is diluted until an aqueous suspension with a 10% by weight dry matter concentration is obtained, using distilled water, in the 10-litre container. 2% of pure stearic acid from Fluka is then added, heated to 70° C. and mixed for 15 minutes, before treating the suspension thus formed by 25% of phosphoric acid in a 20% by weight solution, at 60° C., whilst stirring for 60 minutes at 500 rpm. It is left to react for 30 minutes before drying the suspension thus obtained using a Nara MSD-100 drying machine.

The suspension of mineral pigment obtained before drying has a dry pigment concentration equal to 9.4% by mass, and a pH equal to 6.4.

The granulometry measured using a Sedigraph™ 5100 is such that 91.7% of the particles have a diameter of less than 2 μm and 66.9% of the particles have a diameter of less than 1 μm.

After drying, the product has a BET specific surface area, measured using the BET method of norm ISO 9277, equal to 34.5 $m^2/g$ and a median diameter, determined by measurement using the Sedigraph™ 5100, equal to 0.73 micrometer.

Test n° 6

This test illustrates the invention and concerns a process to obtain pigment according to the invention in which the treatment with 3% of stearic acid takes place before the reaction of the calcium carbonate with the phosphoric acid.

To accomplish this, 0.750 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 78% of dry content, dispersed with 0.5% of a soda polyacrylate, is diluted until an aqueous suspension with a 10% by weight dry matter concentration is obtained, using distilled water, in the 10-litre container. 3% of pure stearic acid from Fluka is then added, heated to 70° C. and mixed for 15 minutes, before treating, leaving it to cool to 60° C., the suspension thus formed by 25% of phosphoric acid in a 20% by weight solution, at 60° C., whilst stirring for 60 minutes at 500 rpm. It is left to react for 30 minutes before drying the suspension thus obtained using a Nara MSD-100 drying machine.

The suspension of mineral pigment obtained before drying has a dry pigment concentration equal to 9.5% by mass, and a pH equal to 6.4.

The granulometry measured using a Sedigraph™ 5100 is such that 93.0% of the particles have a diameter of less than 2 μm and 73.1% of the particles have a diameter of less than 1 μm.

After drying, the product has a BET specific surface area, measured using the BET method of norm ISO 9277, equal to 28.8 $m^2/g$ and a median diameter, determined by measurement using the Sedigraph™ 5100, equal to 0.57 micrometer.

Test n° 7

This test illustrates the invention and concerns a process to obtain the pigment according to the invention in which the treatment with 5% of stearic acid takes place before the reaction of the calcium carbonate with the phosphoric acid.

To accomplish this, 0.750 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 78% of dry content, dispersed with 0.5% of a soda polyacrylate, is diluted until an aqueous suspension with a 10% by weight dry matter concentration is obtained, using distilled water, in the 10-litre container. 5% of pure stearic acid from Fluka is then added, heated to 70° C. and mixed for 15 minutes, before treating, leaving it to cool to 60° C., the suspension thus formed by 25% of phosphoric acid in a 20% by weight solution, at 60° C., whilst stirring for 60 minutes at 500 rpm. It is left to react for 30 minutes before drying the suspension thus obtained using a Nara MSD-100 drying machine The suspension of mineral pigment obtained before drying has a dry pigment concentration equal to 9.6% by mass, and a pH equal to 6.4.

The granulometry measured using a Sedigraph™ 5100 is such that 85.3% of the particles have a diameter of less than 2 μm and 61.9% of the particles have a diameter of less than 1 μm.

After drying, the product has a BET specific surface area, measured using the BET method of norm ISO 9277, equal to 26.5 $m^2/g$ and a median diameter, determined by measurement using the Sedigraph™ 5100, equal to 0.75 micrometer.

Test n° 8

This test illustrates the invention and concerns a process to obtain the pigment according to the invention in which the treatment with 2% of stearic acid takes place during the reaction of the calcium carbonate with the phosphoric acid.

To accomplish this, 200 kg, calculated as dry pigment, of natural calcium carbonate of the French chalk type, of granulometry such that 65% by weight of the particles have a diameter of less than 1 μm, measured using the Sedigraph 5100 of the company Micromeritics, in the form of an aqueous suspension of 78% of dry content, dispersed with 0.5% of a soda polyacrylate, is diluted until an aqueous suspension with a 10% by weight dry matter concentration is obtained, using distilled water, in a 3000-litre recipient. The suspension thus formed is then treated with 36% of phosphoric acid in a 10% by weight solution, at 70° C. whilst stirring, for 120 minutes, at 500 rpm. 2% of stearic acid (of technical quality corresponding to a C16-C18 mixture) in powder form is then added and mixed for 30 minutes before drying the suspension obtained using a Nara MSD-100 drying machine.

The suspension of mineral pigment obtained before drying has a dry pigment concentration equal to 9.2% by mass, and a pH equal to 6.8.

The granulometry measured using a Sedigraph™ 5100 is such that 74.2% of the particles have a diameter of less than 2 μm and 37.5% of the particles have a diameter of less than 1 μm.

After drying the product has a BET specific surface area, measured using the BET method of norm ISO 9277, equal to 31.4 $m^2/g$ and a median diameter, determined by a measurement using the Sedigraph™ 5100, equal to 1.31 micrometer, and a moisture content equal to 1.40% determined using the method described above.

Test n° 9

This test illustrates the invention and concerns a process to obtain the pigment according to the invention in which the treatment with 2% of stearic acid takes place during the reaction of the calcium carbonate with the phosphoric acid, but before the dosing of the said acid.

To accomplish this, 9 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 78% of dry content, dispersed with 0.5% of a soda polyacrylate, is diluted until an aqueous suspension with a 10% by weight dry matter concentration is obtained, using distilled water, in a 135-litre Lödige type fluidised bed. The suspension thus formed is then treated with 13% of phosphoric acid in a 10% by weight solution, at 70° C. whilst stirring, for 24 minutes, at 500 rpm. 2% of stearic acid (of technical quality corresponding to a C16-C18 mixture) in powder form is then added and mixed for 30 minutes before drying the suspension obtained using a Nara MSD-100 drying machine The suspension of mineral pigment obtained before drying has a dry pigment concentration equal to 8.2% by mass, and a pH equal to 7.1.

The granulometry measured using a Sedigraph™ 5100 is such that 87.6% of the particles have a diameter of less than 2 μm and 59.3% of the particles have a diameter of less than 1 μm.

After drying, the product has a BET specific surface area, measured using the BET method of norm ISO 9277, equal to 21.7 $m^2/g$ and a median diameter, determined by measurement using the Sedigraph™ 5100, equal to 0.83 micrometer.

Test n° 10

This test illustrates the invention and concerns a process to obtain the pigment according to the invention in which the treatment with 1% of stearic acid takes place before the reaction of the calcium carbonate with the phosphoric acid.

To accomplish this, 0.750 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 75% of dry content, dispersed with 0.45% of a soda polyacrylate, is diluted until an aqueous suspension with a 10% by weight dry matter concentration is obtained, using distilled water, in a 10-litre ESCO reactor. 1% of stearic acid (of technical quality corresponding to a mixture of type palmitic/stearic, C16-C18) is then added and the mixture mixed for 15 minutes. The suspension thus formed is then treated with 10% of phosphoric acid in a 20% by weight solution, at 60° C. whilst stirring, for 60 minutes. It is left to react for 30 minutes before drying the suspension thus obtained using a Nara MSD-100 drying machine.

The suspension of mineral pigment obtained before drying has a dry pigment concentration equal to 9.6% by mass, and a pH equal to 6.6.

The granulometry measured using a Sedigraph™ 5100 is such that 94.8% of the particles have a diameter of less than 2 μm and 67.0% of the particles have a diameter of less than 1 μm.

After drying, the product has a BET specific surface area, measured using the BET method of norm ISO 9277, equal to 18.9 $m^2/g$ and a median diameter, determined by measurement using the Sedigraph™ 5100, equal to 0.73 micrometer.

Test n° 11

This test illustrates the invention and concerns a process to obtain the pigment according to the invention in which the treatment with 0.5% of stearic acid takes place before the reaction of the calcium carbonate with the phosphoric acid.

To accomplish this, 0.750 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 75% of dry content, dispersed with 0.5% of a soda polyacrylate, is diluted until an aqueous suspension with a 10% by weight dry matter concentration is obtained, using distilled water, in a 10-litre ESCO reactor. 0.5% of stearic acid (of technical quality corresponding to a C16-C18 mixture) is then added and the mixture mixed for 15 minutes. The suspension thus formed is then treated with 20% of phosphoric acid in a 20% by weight solution, at 60° C. whilst stirring, for 60 minutes. It is left to react for 30 minutes before drying the suspension thus obtained using a Nara MSD-100 drying machine.

The suspension of mineral pigment obtained before drying has a dry pigment concentration equal to 9.3% by mass, and a pH equal to 6.6.

The granulometry measured using a Sedigraph™ 5100 is such that 94.8% of the particles have a diameter of less than 2 μm and 68.2% of the particles have a diameter of less than 1 μm.

After drying, the product has a BET specific surface area, measured using the BET method of norm ISO 9277, equal to 32.1 $m^2/g$ and a median diameter, determined by measurement using the Sedigraph™ 5100, equal to 0.74 micrometer.

Test n° 12

This test illustrates the invention and concerns a process to obtain the pigment according to the invention in which the treatment with 1% of stearic acid takes place before the reaction of the calcium carbonate of marble type with the phosphoric acid.

To accomplish this, 0.750 kg, calculated as dry pigment, of natural calcium carbonate of the Norwegian marble type, of granulometry such that 65% by weight of the particles have a diameter of less than 1 μm, measured using the Sedigraph™ 5100 of the company Micromeritics, in the form of an aqueous suspension of 78% of dry content, dispersed with 0.62% of a soda polyacrylate, is diluted until an aqueous suspension with a 10% by weight dry matter concentration is obtained in a 10-litre ESCO reactor. 1% of stearic acid (technical quality corresponding to a C16-C18 mixture) is then added and the mixture mixed for 15 minutes. The suspension thus formed is then treated with 20% of phosphoric acid in a 20% by weight solution, at 60° C. whilst stirring, for 60 minutes. It is left to react for 30 minutes before drying the suspension thus obtained using a Nara MSD-100 drying machine.

The suspension of mineral pigment obtained before drying has a dry pigment concentration equal to 9.5% by mass, and a pH equal to 6.6.

The granulometry measured using a Sedigraph 5100 is such that 89.6% of the particles have a diameter of less than 2 μm and 64.5% of the particles have a diameter of less than 1 μm.

After drying the product has a BET specific surface area, measured using the BET method of norm ISO 9277, equal to 40.2 $m^2/g$ and a median diameter, determined by a measurement using the Sedigraph™ 5100, equal to 0.75 micrometer and a moisture content equal to 1.41% determined using the method described above.

Test n° 13

This test illustrates the invention and concerns a process to obtain pigment according to the invention in which the treatment with stearic acid takes place before the reaction of the calcium carbonate with the phosphoric acid, since the test uses Winnofil SPT from the company Solvay which is a precipitated calcium carbonate treated by a fatty acid the granulometry of which measured using the Sedigraph™ 5100 is such that 89.6% of the particles have a diameter of less than 2 μm and 64.5% of the particles have a diameter of less than 1 μm, and the BET specific surface area is equal to 17.8 $m^2/g$ (measured using the BET method of norm ISO 9277).

To accomplish this, 0.750 kg of Winnofil SPT, calculated as dry pigment, in the form of an aqueous suspension of 78% of dry content, dispersed with 0.5% of a soda polyacrylate, is diluted until an aqueous suspension is obtained with a 10% by weight dry matter concentration is obtained, using distilled water, in the 10-litre ESCO reactor. The suspension thus formed is then treated by 20% of phosphoric acid in a 20% by weight solution, at 60° C. whilst stirring for 60 minutes before drying the suspension obtained using a Nara MSD-100 drying machine.

The suspension of mineral pigment obtained before drying has a dry pigment concentration equal to 9.3% by mass, and a pH equal to 6.4.

The granulometry measured using a Sedigraph™ 5100 is such that 62.9% of the particles have a diameter of less than 2 μm and 51.4% of the particles have a diameter of less than 1 μm.

After drying, the product has a BET specific surface area, measured using the BET method of norm ISO 9277, equal to 52.1 $m^2/g$ and a median diameter, determined by measurement using the Sedigraph™ 5100, equal to 0.90 micrometer.

Test n° 14

This test illustrates the invention and concerns a process to obtain pigment according to the invention in which the treatment with stearic acid takes place before the reaction of the calcium carbonate with the phosphoric acid, since the test uses Socal 322 from the company Solvay which is a precipitated calcium carbonate treated by a fatty acid the granulometry of which measured using the Sedigraph™ 5100 is such that 90.0% of the particles have a diameter of less than 2 μm and 86.0% of the particles have a diameter of less than 1 μm, and the BET specific surface area is equal to 17.5 $m^2/g$ (measured using the BET method of norm ISO 9277).

To accomplish this, 0.750 kg of Socal 322, calculated as dry pigment, in the form of an aqueous suspension of 78% of dry content, dispersed with 0.5% of a soda polyacrylate, is diluted until an aqueous suspension with a 10% by weight dry matter concentration is obtained, using distilled water, in the 10-litre ESCO reactor. The suspension thus formed is then treated by 20% of phosphoric acid in a 20% by weight solution, at 60° C. whilst stirring for 60 minutes before drying the suspension obtained using a Nara MSD-100 drying machine.

The suspension of mineral pigment obtained before drying has a dry pigment concentration equal to 9.3% by mass, and a pH equal to 6.3.

The granulometry measured using a Sedigraph™ 5100 is such that 87.9% of the particles have a diameter of less than 2 μm and 77.9% of the particles have a diameter of less than 1 μm.

After drying, the product has a BET specific surface area, measured using the BET method of norm ISO 9277, equal to 48.4 $m^2/g$ and a median diameter, determined by measurement using the Sedigraph™ 5100, equal to 0.30 micrometer.

Test n° 15

This test illustrates the invention and concerns a process to obtain the pigment according to the invention in which the treatment with 2% of a mixture of fatty acid and fatty alcohol takes place before the reaction of the calcium carbonate of chalk type with the phosphoric acid.

To accomplish this, 0.750 kg, calculated as dry pigment, of natural calcium carbonate of the French chalk type, of granulometry such that 65% by weight of the particles have a diameter of less than 1 μm, measured using the Sedigraph™ 5100 of the company Micromeritics, in the form of an aqueous suspension of 75% of dry content, dispersed with 0.5% of a soda polyacrylate, is diluted until an aqueous suspension with a 10% by weight dry matter concentration is obtained, using distilled water, in the 10-litre ESCO reactor. 0.2% of vegetal oil-based fatty acid sold by the company Hobum Oleochemicals (Hamburg, Germany) under the acid name "isomergine" is then added with 1.8% of stearilic acid, and the mixture is mixed for 15 minutes. The suspension thus formed is then treated with 25% of phosphoric acid in a 30% by weight solution, at 60° C. whilst stirring, for 60 minutes. It is left to react for 30 minutes before drying the suspension thus obtained using a Nara MSD-100 drying machine.

The suspension of mineral pigment obtained before drying has a dry pigment concentration equal to 9.8% by mass, and a pH equal to 6.0.

The granulometry measured using a Sedigraph™ 5100 is such that 74.1% of the particles have a diameter of less than 2 μm and 38.0% of the particles have a diameter of less than 1 μm.

After drying, the product has a BET specific surface area, measured using the BET method of norm ISO 9277, equal to 24.0 $m^2/g$ and a median diameter, determined by measurement using the Sedigraph™ 5100, equal to 1.29 micrometer.

Test n° 16

This test illustrates the invention and concerns a process to obtain the pigment according to the invention in which the treatment with 2% of a mixture of fatty acid and fatty alcohol takes place before the reaction of the calcium carbonate of chalk type with the phosphoric acid.

To accomplish this, 0.750 kg, calculated as dry pigment, of natural calcium carbonate of the French chalk type, of granulometry such that 32% by weight of the particles have a diameter of less than 1 μm, measured using the Sedigraph™ 5100 of the company Micromeritics, in the form of an aqueous suspension of 65% of dry content, dispersed with 0.13% of a soda polyacrylate, is diluted until an aqueous suspension with a 10% by weight dry matter concentration is obtained, using distilled water, in the 10-litre ESCO reactor. 0.5% of vegetal oil-based fatty acid sold by the company Hobum Oleochemicals (Hamburg, Germany) under the acid name "isomergine" is then added with 1.5% of dodecylic alcohol, and the mixture is mixed for 15 minutes; subsequently the suspension thus formed is treated by 25% of phosphoric acid in a solution 30% by weight, at 60° C. whilst stirring for 60 minutes. It is left to react for 30 minutes before drying the suspension thus obtained using a Nara MSD-100 drying machine.

The suspension of mineral pigment obtained before drying has a dry pigment concentration equal to 9.8% by mass, and a pH equal to 6.0.

The granulometry measured using a Sedigraph™ 5100 is such that 57.3% of the particles have a diameter of less than 2 μm and 25.3% of the particles have a diameter of less than 1 μm.

After drying, the product has a BET specific surface area, measured using the BET method of norm ISO 9277, equal to 31.0 $m^2/g$ and a median diameter, determined by measurement using the Sedigraph™ 5100, equal to 1.79 micrometer.

Test n° 17

This test illustrates the invention and concerns a process to obtain the pigment according to the invention in which the treatment with 2% of fatty acid takes place before the reaction of the calcium carbonate of chalk type with the phosphoric acid.

To accomplish this, 0.750 kg, calculated as dry pigment, of natural calcium carbonate of the French chalk type, of granulometry such that 32% by weight of the particles have a diameter of less than 1 μm, measured using the Sedigraph™ 5100 of the company Micromeritics, in the form of an aqueous suspension of 65% of dry content, dispersed with 0.13% of a soda polyacrylate, is diluted until an aqueous suspension with a 10% by weight dry matter concentration is obtained, using distilled water, in the 10-litre ESCO reactor. 2.0% of stearilic alcohol is then added and the mixture is mixed for 15 minutes; the suspension thus formed is then treated with 25% of phosphoric acid in a 30% by weight solution, at 60° C. whilst stirring for 60 minutes. It is left to react for 30 minutes before drying the suspension thus obtained using a Nara MSD-100 drying machine.

The suspension of mineral pigment obtained before drying has a dry pigment concentration equal to 9.8% by mass, and a pH equal to 6.1.

The granulometry measured using a Sedigraph™ 5100 is such that 74.8% of the particles have a diameter of less than 2 μm and 36.8% of the particles have a diameter of less than 1 μm.

After drying, the product has a BET specific surface area, measured using the BET method of norm ISO 9277, equal to 23.9 $m^2/g$ and a median diameter, determined by measurement using the Sedigraph™ 5100, equal to 1.30 micrometer.

Test n° 18

This test illustrates the invention and concerns a process to obtain the pigment according to the invention in which the treatment with 2% of stearic acid is undertaken continuously during the manufacture of the precipitated calcium carbonate and treatment with the moderately strong to strong H3O+ ion donator.

To accomplish this, the process is undertaken by preparing 400 g of $Ca(OH)_2$ in 7600 g of distilled water in the 10-litre ESCO reactor, followed by the addition of $CO_2$ in gaseous form at 30° C. until a pH equal to 6.5 is obtained.

After having left it to react for 30 minutes, the suspension is heated in the reactor to 60° C., after which 2.0% of stearic acid is added and the mixture mixed for 15 minutes; the suspension thus formed is then treated with 20% of phosphoric acid in a 30% by weight solution, whilst stirring for 60 minutes. It is left to react for 30 minutes before drying the suspension thus obtained using a Nara MSD-100 drying machine.

The suspension of mineral pigment obtained before drying has a dry pigment concentration equal to 5.7% by mass, and a pH equal to 6.4.

The granulometry measured using a Sedigraph™ 5100 is such that 41.4% by weight of the particles have a diameter of less than 2 μm and 18.1% by weight of the particles have a diameter of less than 1 μm.

After drying, the product has a BET specific surface area, measured using the BET method of norm ISO 9277, equal to 37.9 $m^2/g$ and a median diameter, determined by measurement using the Sedigraph™ 5100, equal to 2.29 micrometer.

Test n° 19

This test illustrates the invention and concerns a process to obtain pigment according to the invention in which the treatment with 1% of fatty acid takes place before the reaction of the calcium carbonate of chalk type with the phosphoric acid.

To accomplish this, 0.750 kg, calculated as dry pigment, of natural calcium carbonate of the French chalk type, of granulometry such that 50% by weight of the particles have a diameter of less than 1 μm, measured using the Sedigraph 5100 of the company Micromeritics, in the form of an aqueous suspension of 75% of dry content, dispersed with 0.6% of a soda polyacrylate, is diluted until an aqueous suspension with a 10% by weight dry matter concentration is obtained, using distilled water, in the 10-litre ESCO reactor. 1.0% of stearic acid is then added and the mixture is mixed for 15 minutes. The suspension thus formed is then treated with 25% of phosphoric acid in a 20% by weight solution, at 60° C. whilst stirring, for 60 minutes. It is left to react for 30 minutes before drying the suspension thus obtained using a Nara MSD-100 drying machine.

The suspension of mineral pigment obtained before drying has a dry pigment concentration equal to 9.3% by mass, and a pH equal to 6.5.

The granulometry measured using a Sedigraph™ 5100 is such that 94.9% by weight of the particles have a diameter of less than 2 μm and 67.0% by weight of the particles have a diameter of less than 1 μm.

After drying, the product has a BET specific surface area, measured using the BET method of norm ISO 9277, equal to 34.9 $m^2/g$ and a median diameter, determined by measurement using the Sedigraph™ 5100, equal to 0.76 micrometer.

Test n° 20

This test illustrates the invention and concerns a process to obtain pigment according to the invention in which the treatment with 1% of fatty acid takes place after the reaction of the calcium carbonate of chalk type with the phosphoric acid.

To accomplish this, 0.750 kg, calculated as dry pigment, of natural calcium carbonate of the French chalk type, of granulometry such that 50% by weight of the particles have a diameter of less than 1 μm, measured using the Sedigraph 5100 of the company Micromeritics, in the form of an aqueous suspension of 75% of dry content, dispersed with 0.6% of a soda polyacrylate, is diluted until an aqueous suspension with a 10% by weight dry matter concentration is obtained, using distilled water, in the 10-litre ESCO reactor. The suspension thus formed is then treated with 20% of phosphoric acid in a 20% by weight solution, at 60° C. whilst stirring, for 60 minutes, at 500 rpm. 1% of stearic acid in powder form is then added and mixed for 30 minutes before drying the suspension obtained using a Nara MSD-100 drying machine.

The suspension of mineral pigment obtained before drying has a dry pigment concentration equal to 9.5% by mass, and a pH equal to 6.5.

The granulometry measured using a Sedigraph™ 5100 is such that 94.1% by weight of the particles have a diameter of less than 2 μm and 66.2% by weight of the particles have a diameter of less than 1 μm.

After drying, the product has a BET specific surface area, measured using the BET method of norm ISO 9277, equal to 30.4 $m^2/g$ and a median diameter, determined by measurement using the Sedigraph™ 5100, equal to 0.77 micrometer.

Test n° 21

This test illustrates the invention and concerns a process to obtain pigment according to the invention in which the treatment with 2% of sulphonic dodecylbenzene takes place after the reaction of the calcium carbonate of chalk type with the phosphoric acid.

To accomplish this, 0.750 kg, calculated as dry pigment, of natural calcium carbonate of the French chalk type, of granulometry such that 50% by weight of the particles have a diameter of less than 1 μm, measured using the Sedigraph™ 5100 of the company Micromeritics, in the form of an aqueous suspension of 75% of dry content, dispersed with 0.6% of a soda polyacrylate, is diluted until an aqueous suspension with a 10% by weight dry matter concentration is obtained, using distilled water, in the 10-litre ESCO reactor. The suspension thus formed is then treated with 25% of phosphoric acid in a 30% by weight solution, at 60° C. whilst stirring, for 60 minutes, at 500 rpm. 2% of sulphonic dodecylbenzene acid in powder form is then added and mixed for 30 minutes before drying the suspension obtained using the Nara MSD-100 drying machine.

The suspension of mineral pigment obtained before drying has a dry pigment concentration equal to 10.0% by mass, and a pH equal to 6.6.

The granulometry measured using a Sedigraph™ 5100 is such that 93.9% by weight of the particles have a diameter of less than 2 μm and 59.6% by weight of the particles have a diameter of less than 1 μm.

After drying, the product has a BET specific surface area, measured using the BET method of norm ISO 9277, equal to 35.4 $m^2/g$ and a median diameter, determined by measurement using the Sedigraph™ 5100, equal to 0.87 micrometer.

Test n° 22

This test illustrates the invention and concerns a process to obtain pigment according to the invention in which the treatment with 2% of lauric acid takes place after the reaction of the calcium carbonate of marble type with the phosphoric acid.

To accomplish this, 0.750 kg, calculated as dry pigment, of natural calcium carbonate of the Norwegian marble type, of granulometry such that 65% by weight of the particles have a diameter of less than 1 μm, measured using the Sedigraph™ 5100 of the company Micromeritics, in the form of an aqueous suspension of 78% of dry content, dispersed with 0.62% of a soda polyacrylate, is diluted until an aqueous suspension with a 10% by weight dry matter concentration is obtained in a 10-litre ESCO reactor. The suspension thus formed is then treated with 20% of phosphoric acid in a 30% by weight solution, at 60° C. whilst stirring, for 60 minutes. 2% of laurylic acid is then added and mixed for 30 minutes before drying the suspension obtained using a Nara MSD-100 drying machine.

The suspension of mineral pigment obtained before drying has a dry pigment concentration equal to 9.8% by mass, and a pH equal to 6.8.

The granulometry measured using a Sedigraph™ 5100 is such that 88.8% by weight of the particles have a diameter of less than 2 μm and 64.8% by weight of the particles have a diameter of less than 1 μm.

After drying the product has a BET specific surface area, measured using the BET method of norm ISO 9277, equal to 35.0 $m^2/g$ and a median diameter, determined by a measurement using the Sedigraph™ 5100, equal to 0.65 micrometer and a moisture content equal to 1.26% determined using the method described above.

EXAMPLE 3

This example concerns the use of the pigments according to the invention as a rheology regulator for the preparation of a polyvinyl chloride (PVC)-based plastisol.

The charged plastisol is produced by mixing the non-charged PVC-based plastisol and the calcium carbonate, or again the mineral pigment for testing in a recipient measuring 7 cm in diameter and by blending with a spatula. The total weight of the mixture is 200 g. The mixture is then dispersed for two minutes using a "Pendraulik"™LD50 laboratory mixing machine, where the diameter of the dispersion disk is 5 cm, and the speed of rotation of the disk is 2700 rpm (manual adjustment to position three).

When the dispersion is completed, the viscosity is measured using the "Rheomat 120"™ machine, a measuring machine according to norm DIN 125, at 20° C.

The pour point is determined using the Bingham model, which is well known to the skilled man in the art, after ageing for 24 hours and 30 days at a temperature of 23° C.

In all the tests of the example, the aim of which is to obtain a lightened motor vehicle body with a rheology of constant formulation, the formulation of the PVC (polyvinyl chloride)-based plastisol has as its formulation the following formulation 1:

90% by weight of Henkel-Teroson's PVC resin plastisol,
10% by weight of the mineral filler for testing.

Test n° 23

This test illustrates the prior art and uses the precipitated calcium carbonate sold by the company Solvay under the name Winnofil SPT™. This test is used as a reference.

Test n° 24

This test illustrates the prior art and uses a calcium carbonate from test n° 1. The pour point after 30 days' ageing at 23° C. in formulation 1 is 63.6% higher than that of test n° 23.

Test n° 25

This test illustrates the prior art and uses a calcium carbonate from test n° 3 treated with 3% of stearic acid after drying. The treatment was undertaken for ten minutes in a laboratory mixer from MTI at 120° C.; the rotational speed was 1500 rpm. The pour point after 30 days' ageing at 23° C. in formulation 1 is 49.0% lower than that of test n° 23.

Treatment after drying does not work.

Test n° 26

This test illustrates the prior art and uses a precipitated calcium carbonate sold by the company Solvay under the name Socal™ 322. The pour point after 30 days' ageing at 23° C. in formulation 1 is 16.8% higher than that of test n° 23.

Test n° 27

This test illustrates the prior art and uses a calcium carbonate sold by the company Omya under the name Hydrocarb™ 120T. The pour point after 30 days' ageing at 23° C. in formulation 1 is 7.7% lower than that of test n° 23.

Test n° 28

This test illustrates the prior art and uses a calcium carbonate sold by the company Omya under the name Omyabond™ 302. The pour point after 30 days' ageing at 23° C. in formulation 1 is 1.4% higher than that of test n° 23.

Test n° 29

This test illustrates the prior art and uses a calcium carbonate sold by the company Omya under the name Omyabond™ 301. The pour point after 30 days' ageing at 23° C. in formulation 1 is 24.5% lower than that of test n° 23.

Test n° 30

This test illustrates the invention and uses the calcium carbonate of test n° 4. The pour point after 30 days' ageing at 23° C. in formulation 1 is 53.1% higher than that of test n° 23.

Test n° 31

This test illustrates the invention and uses the calcium carbonate of test n° 5. The pour point after 30 days' ageing at 23° C. in formulation 1 is 102.1% higher than that of test n° 23.

Test n° 32

This test illustrates the invention and uses the calcium carbonate of test n° 6. The pour point after 30 days' ageing at 23° C. in formulation 1 is 36.4% higher than that of test n° 23.

Test n° 33

This test illustrates the invention and uses the calcium carbonate of test n° 7. The pour point after 30 days' ageing at 23° C. in formulation 1 is 4.2% higher than that of test n° 23.

Test n° 34

This test illustrates the invention and uses the calcium carbonate of test n° 8. The pour point after 30 days' ageing at 23° C. in formulation 1 is 86.7% higher than that of test n° 23.

All the results of the above tests are recorded in table 1 below.

Test n° 36

This test illustrates the prior art and uses a precipitated calcium carbonate sold by the company Solvay under the name Socal™ 322. The pour point after 30 days' ageing at 23° C. in formulation 2 is 108.3% higher than that of test n° 35.

Test n° 37

This test illustrates the prior art and uses a calcium carbonate sold by the company Omya under the name Omyabond™ 302. The pour point after 30 days' ageing at 23° C. in formulation 2 is 102.8% higher than that of test n° 35.

Test n° 38

This test illustrates the prior art and uses a calcium carbonate sold by the company Omya under the name Omyabond™ 301. The pour point after 30 days' ageing at 23° C. in formulation 2 is 58.3% lower than that of test n° 35.

TABLE 1

| | | Test n° | | | | | | | | | | | |
|---|---|---|---|---|---|---|---|---|---|---|---|---|---|
| | | 23 | 24 | 25 | 26 | 27 | 28 | 29 | 30 | 31 | 32 | 33 | 34 |
| Filler rate (% by weight) | $CaCO_3$ | 10 | 10 | 10 | 10 | 10 | 10 | 10 | 10 | 10 | 10 | 10 | 10 |
| Viscosity [Pa] at | Shearing speed 20 $s^{-1}$ | 162 | 280 | 88 | 193 | 150 | 164 | 140 | 274 | 325 | 263 | 216 | 324 |
| | Shearing speed 300 $s^{-1}$ | 756 | 813 | 556 | 839 | 650 | 685 | 738 | 1093 | 1224 | 1139 | 1037 | 1433 |
| | Pour point After ageing for 24 h | 179 | 304 | 95 | 236 | 180 | 173 | 147 | 283 | 360 | 314 | 275 | 282 |
| | Pour point After ageing for 30 days | 143 | 234 | 73 | 167 | 132 | 145 | 108 | 219 | 289 | 195 | 149 | 267 |

A reading of table 1 enables it to be seen the satisfactory rheology results obtained with the products according to the invention.

EXAMPLE 4

This example concerns the use of the pigments according to the invention as a rheology regulator for the preparation of a polyvinyl chloride (PVC)-based plastisol and of a formulation different to that of example 3.

To accomplish this a formulation 2 is produced with the same operating method and the same equipment as in example 3.

This formulation 2, a PVC-based plastisol, consists of:

24% by weight of a PVC resin Vestolit E 7031™ (Vestolit, Germany), 6.0% by weight of a PVC resin Vestolit C 65™ (Vestolit, Germany), 47.0% by weight of a plasticiser DINP (Diisononylphthalate), 2.0% by weight of a desiccative Super Weisskalk 40 (Omya AG, Switzerland), 1.0% by weight of an adhesion promoter EURETEK 505™ (Ciba SC, Switzerland), 20.0% by weight of mineral pigment for testing.

For each of the tests in the example, the viscosity and pour point measurements are undertaken using the same operating method and the same equipment as in the previous example.

Test n° 35

This test illustrates the prior art and uses the precipitated calcium carbonate sold by the company Solvay under the name Winnofil SPT™. This test is used as a reference.

Test n° 39

This test illustrates the prior art and uses a calcium carbonate from test n° 2. The pour point after 30 days' ageing at 23° C. in formulation 2 is 275% higher than for that of test n° 35.

Test n° 40

This test illustrates the invention and uses the calcium carbonate of test n° 11. The pour point after 30 days' ageing at 23° C. in formulation 2 is 275% higher than that of test n° 35.

Test n° 41

This test illustrates the invention and uses the calcium carbonate of test n° 12. The pour point after 30 days' ageing at 23° C. in formulation 2 is 319.4% higher than that of test n° 35.

Test n° 42

This test illustrates the invention and uses the calcium carbonate of test n° 13. The pour point after 30 days' ageing at 23° C. in formulation 2 is 350% higher than that of test n° 35.

Test n° 43

This test illustrates the invention and uses the calcium carbonate of test n° 14. The pour point after 30 days' ageing at 23° C. in formulation 2 is 422.2% higher than that of test n° 35.

All the results of the example are recorded in table 2 below.

TABLE 2

| | | Test n° | | | | | | | | |
|---|---|---|---|---|---|---|---|---|---|---|
| | | 35 | 36 | 37 | 38 | 39 | 40 | 41 | 42 | 43 |
| Filler rate (% by weight) | $CaCO_3$ | 20 | 20 | 20 | 20 | 20 | 20 | 20 | 20 | 20 |
| Viscosity [Pa] at | Shearing speed 20 $s^{-1}$ | 65 | 98 | 85 | 38 | 158 | 160 | 180 | 195 | 216 |
| | Shearing speed 300 $s^{-1}$ | 573 | 614 | 536 | 465 | 675 | 692 | 797 | 968 | 860 |
| | Pour point After ageing for 24 h | 45 | 166 | 61 | 35 | 275 | 289 | 334 | 412 | 443 |
| | Pour point After ageing for 30 days | 36 | 75 | 73 | 15 | 135 | 135 | 151 | 162 | 188 |

A reading of table 2 enables it to be seen that the best rheology results are obtained with the products according to the invention.

EXAMPLE 5

This example concerns the use of the pigments according to the invention as a rheology regulator for the preparation of a polyvinyl chloride (PVC)-based plastisol and of a formulation different to that of examples 3 and 4.

To accomplish this a formulation 3 is produced with the same operating method and the same equipment as in example 3.

This formulation 3, a PVC-based plastisol, consists of:

31.0% by weight of a PVC resin Vestolit E 7031™ (Vestolit, Germany), 43.0% by weight of a plasticiser DINP (Diisononylphthalate), 1.5% by weight of a desiccative Super Weisskalk 40 (Omya AG, Switzerland), 1.0% by weight of an adhesion promoter EURETEK 505™ (Ciba SC, Switzerland), 1.0% by weight of a thermal stabiliser Irgastab 17™ (Ciba SC, Switzerland), 22.5% by weight of mineral pigment for testing.

For each of the tests in the example, the viscosity and pour point measurements are undertaken using the same operating method and the same equipment as in the previous example.

Test n° 44

This test illustrates the prior art and uses the precipitated calcium carbonate sold by the company Solvay under the name Winnofil SPT™. This test is used as a reference.

Test n° 45

This test illustrates the prior art and uses a precipitated calcium carbonate sold by the company Solvay under the name Socal™ 322. The pour point after 30 days' ageing at 23° C. in formulation 3 is 200% higher than that of test n° 44.

Test n° 46

This test illustrates the prior art and uses a calcium carbonate sold by the company Omya under the name Omyabond™ 302. The pour point after 30 days' ageing at 23° C. in formulation 3 is 55.3% lower than that of test n° 44.

Test n° 47

This test illustrates the prior art and uses a calcium carbonate sold by the company Omya under the name Omyabond™ 301. The pour point after 30 days' ageing at 23° C. in formulation 3 is 12.8% higher than that of test n° 44.

Test n° 48

This test illustrates the invention and uses the calcium carbonate of test n° 15. The pour point after 30 days' ageing at 23° C. in formulation 3 is 342.6% higher than that of test n° 44.

Test n° 49

This test illustrates the invention and uses the calcium carbonate of test n° 16. The pour point after 30 days' ageing at 23° C. in formulation 3 is 712.8% higher than that of test n° 44.

Test n° 50

This test illustrates the invention and uses the calcium carbonate of test n° 17. The pour point after 30 days' ageing at 23° C. in formulation 3 is 459.6% higher than that of test n° 44.

Test n° 51

This test illustrates the invention and uses the calcium carbonate of test n° 18. The pour point after 30 days' ageing at 23° C. in formulation 3 is 740.4% higher than that of test n° 44.

All the results of the example are recorded in table 3 below.

TABLE 3

| | | Test n° | | | | | | | |
|---|---|---|---|---|---|---|---|---|---|
| | | 44 | 45 | 46 | 47 | 48 | 49 | 50 | 51 |
| Filler rate (% by weight) | $CaCO_3$ | 22.5 | 22.5 | 22.5 | 22.5 | 22.5 | 22.5 | 22.5 | 22.5 |
| Viscosity [Pa] at | Shearing speed 20 s − 1 | 104 | 181 | 58 | 96 | 276 | 453 | 302 | 418 |
| | Shearing speed 300 s − 1 | 1111 | 1139 | 783 | 898 | 1355 | 1789 | 1383 | 1690 |

TABLE 3-continued

| | Test n° | | | | | | | |
|---|---|---|---|---|---|---|---|---|
| | 44 | 45 | 46 | 47 | 48 | 49 | 50 | 51 |
| Pour point After ageing for 24 h | 90 | 158 | 22 | 69 | 245 | 400 | 312 | 307 |
| Pour point After ageing for 30 days | 47 | 141 | 21 | 53 | 208 | 382 | 263 | 395 |

A reading of the results of table 3 shows that one also obtains satisfactory rheological results by using mixtures of fatty acids and fatty alcohols or again by using only fatty alcohols.

Test n° 51 shows that the invention is also applicable during the manufacture of precipitated calcium carbonate.

EXAMPLE 6

This example concerns the use of the pigments according to the invention as a rheology regulator for the preparation of a polyvinyl chloride (PVC)-based plastisol the formulation of which differs from that of example 5 by the rate of filler for testing.

To accomplish this a formulation 4 is produced with the same operating method and the same equipment as in example 3.

This formulation 4, a PVC-based plastisol, consists of:

31.0% by weight of a PVC resin Vestolit E 7031™ (Vestolit, Germany), 43.0% by weight of a plasticiser DINP (Diisononylphthalate), 1.5% by weight of a desiccative Super Weisskalk 40 (Omya AG, Switzerland), 1.0% by weight of an adhesion promoter EURETEK 505™ (Ciba SC, Switzerland), 1.0% by weight of a thermal stabiliser Irgastab BZ 529™ (Ciba SC, Switzerland), 15.0% to 22.5% by weight of mineral pigment for testing.

For each of the tests in the example, the viscosity and pour point measurements are undertaken using the same operating method and the same equipment as in the previous example.

Test n° 52

This test illustrates the prior art and uses 22.5% of the precipitated calcium carbonate sold by the company Solvay under the name Winnofil SPT™. This test is used as a reference.

Test n° 53

This test illustrates the prior art and uses 22.5% of the precipitated calcium carbonate sold by the company Solvay under the name Socal™ 322. The pour point after 30 days' ageing at 23° C. in formulation 4 is 42% higher than that of test n° 52.

Test n° 54

This test illustrates the invention and uses 20.0% of the calcium carbonate of test n° 21.

Test n° 55

This test illustrates the invention and uses 15.0% of the calcium carbonate of test n° 21.

Test n° 56

This test illustrates the invention and uses 20.0% of the calcium carbonate of test n° 22.

Test n° 57

This test illustrates the invention and uses 15.0% of the calcium carbonate of test n° 22.

All the results of the example are recorded in table 4 below.

TABLE 4

| | | Test n° | | | | | |
|---|---|---|---|---|---|---|---|
| | | 52 | 53 | 54 | 55 | 56 | 57 |
| Filler rate (% by weight) | $CaCO_3$ | 22.5 | 22.5 | 20.0 | 15.0 | 20.0 | 15.0 |
| Viscosity [Pa] at | Shearing speed 20 $s^{-1}$ | 153 | 213 | 314 | 133 | 408 | 178 |
| | Shearing speed 300 $s^{-1}$ | 1008 | 1031 | 1250 | 844 | 1409 | 925 |
| | Pour point After ageing for 24 h | 101 | 207 | 283 | 112 | 300 | 196 |
| | Pour point After ageing for 30 days | 131 | 186 | 261 | 133 | 349 | 178 |

A reading of table 4 above enables one to observe that the use of the pigment according to the invention allows a reduction of the mineral filler of the plastisols to reach the same pour point as with the pigments habitually used of approximately 33%, at least, resulting in a reduction in the weight of filled plastisol.

EXAMPLE 7

This example illustrates the invention and concerns the use of the pigments according to the invention made using rigid PVC (rigid polyvinyl chloride), such as the frame of motor vehicle bodies, with a view to reducing the weight, whilst retaining control of solidity.

In the various tests of the example the replacement of the calcium carbonate of the prior art by mineral pigment according to the invention was tested.

In a rigid PVC formulation, it was sought to compare the influence of 100% substitution of the mineral filler of prior art by a mineral pigment according to the invention.

To accomplish this, the traction resistance (which is representative of solidity for the skilled man in the art) of the following rigid PVC formulation was measured:

100 phr. of a rigid PVC resin EVIPOLSH 6521 (EVC, Germany), 1.5 phr. of a thermal stabiliser of tribasic lead sulphate Naftorin T 3 (Chemson, England), 1.5 phr. of a thermal stabiliser of dibasic lead sulphate Listab 51 (Chemson, England), 0.6 phr. of a lubricant Ca F 1 (Hoechst, Germany), 0.05 phr of a lubricant E-Wachs (Hoechst, Germany), phr. mineral pigment for testing.

The rigid PVC resin and the mineral filler for testing are mixed in a two-roller grinding machine (Collin, type 150×400) at a temperature of 190° C. The rigid PVC plate is calendered after moulding by compression in plate form at 190° C. (Collin, type P 300 P).

Specimens are formed from this plate for the traction test according to norm DIN 53 455. Traction resistance measurement is undertaken using the "Zwick/Roell"™ Z020 instrument and according to norm DIN 53 455.

Test n° 58

This test illustrates the prior art and uses the precipitated calcium carbonate sold by the company Solvay under the name Winnofil SPT™. This test is used as a reference.

Test n° 59

This test illustrates the prior art and uses the precipitated calcium carbonate sold by the company Solvay under the name Socal™ 322. Use of Socal™ 322 results in the same traction resistance as use of Winnofil SPT™.

Test n° 60

This test illustrates the prior art and uses the calcium carbonate sold by the company Omya under the name Hydrocarb™ 120T. Use of Hydrocarb™ 120T results in the same traction resistance as use of Winnofil SPT™.

Test n° 61

This test illustrates the prior art and uses the calcium carbonate sold by the company Omya under the name Omyabond™ 301. Use of Omyabond™ 301 results in the same traction resistance as use of Winnofil SPT™.

EXAMPLE 8

This example illustrates the invention and concerns mineral pigments according to the invention (tests n° 62, 63, 64 and 65), their manufacturing process according to the invention (tests n° 62, 63, 64 and 65), and their use according to the invention in plastisol-type PVC formulations (tests n° 63, 64 and 65).

Test n° 62

This test illustrates the invention and concerns a process to obtain the pigment according to the invention in which the treatment with 1% of a mixture of fatty acids takes place before the reaction of the calcium carbonate of marble type with the phosphoric acid.

To accomplish this, 6,974 kg (by weight of dry pigment) of natural calcium carbonate of the Norwegian marble type, of granulometry such that 65% by weight of the particles have a diameter of less than 1 μm, measured using the Sedigraph™ 5100 of the company Micromeritics™, in the form of an aqueous suspension of 78% of dry content, dispersed with 0.5% of a soda polyacrylate, is diluted until an aqueous suspension with a 65% by weight of dry matter is obtained, using distilled water, in the 10-litre ESCO™ reactor.

The suspension thus formed is then treated, at a temperature equal to 70° C., with 1% of fatty acid in suspension, consisting in a oil of sunflower, based on palmitic acid, stearic acid, oleic acid, linoleic and linolenic acid, with a CAS number equal to 67701-08-0.

After 5 minutes of stirring, the suspension thus formed is treated with 1% of phosphoric acid in a 10% by weight solution, under stirring during 30 minutes.

After the addition of 94 g of calcium hydroxide of 14% by weight, the suspension has a pH equal to 8.6 and a percentage of dry solid content equal to 62.2%.

The suspension thus obtained is dried at 80° C., using a Nara™ MSD-100 drying machine.

A mineral pigment according to the invention is thus obtained.

Test n° 63

This test illustrates the invention and concerns a process to obtain the pigment according to the invention in which the treatment with 1% of a mixture of fatty acids takes place after the reaction of the calcium carbonate of marble type with the phosphoric acid.

To accomplish this, 0,707 kg (by weight of dry pigment) of natural calcium carbonate of the Norwegian marble type, of granulometry such that 65% by weight of the particles have a diameter of less than 1 μm, measured using the Sedigraph 5100 of the company Micromeritics™, in the form of an aqueous suspension of 78% of dry content, dispersed with 0.5% of a soda polyacrylate, is diluted until an aqueous suspension with a 65% by weight of dry matter is obtained, using distilled water, in the 10-litre ESCO™ reactor.

The suspension thus formed is then treated, at a temperature equal to 70° C., with 50% of phosphoric acid in a 10% by weight solution, under stirring during 30 minutes Then, 1% of fatty acids consisting in a mixture of palmitic acid and stearic acid in a weight ratio 1/1, in a powder form, is added After the addition of 135 g of calcium hydroxide of 14% by weight, the suspension has a pH equal to 8.1 and a percentage of dry solid content equal to 7.5%.

The suspension thus obtained is dried at 80° C., using a Nara™ MSD-100 drying machine.

A plastisol-type PVC formulation is then prepared, comprising, in percentage of weight, 33,4% of Vestolit™ E 7031, 44% of diisononyl phthalate, 1,6% of Weisskalk™ Super 40, 1% of Euretek™ 505 and 20% of the mineral pigment according to the invention previously obtained.

The yield point of this composition, measured after 72 hours according to the methods well known by the skilled man in the art, is equal to 548 Pa.

Test n° 64

This test illustrates the invention and concerns a process to obtain the pigment according to the invention in which the treatment with 0,5% of a mixture of fatty acids takes place after the reaction of the calcium carbonate of marble type with a mixture of phosphoric acid and sulphuric acid.

To accomplish this, 0,698 kg (by weight of dry pigment) of natural calcium carbonate of the Norwegian marble type, of granulometry such that 65% by weight of the particles have a diameter of less than 1 μm, measured using the Sedigraph 5100 of the company Micromeritics™, in the form of an aqueous suspension of 78% of dry content, dispersed with 0.5% of a soda polyacrylate, is diluted until an aqueous suspension with a 65% by weight of dry matter is obtained, using distilled water, in the 10-litre ESCO™ reactor.

The suspension thus formed is then treated, at a temperature equal to 70° C., with 50% of a mixture of phosphoric acid and sulphuric acid in a 10% by weight solution, under stirring during 60 minutes Then, the obtained suspension is treated with 0,5% of fatty acids in suspension, consisting in a linseed oil, with a composition in weight of 8% of fatty acids having from 12 to 16 carbon atoms, 3% of stearic acid, 19% of oleic acid, 16% of linoleic acid, 52% of linolenic acid and 2% of acid having from 20 to 22 carbon atoms.

After the addition of 250 g of calcium hydroxide of 14% by weight, the suspension has a pH equal to 8.1 and a percentage of dry solid content equal to 7.55%.

The suspension thus obtained is dried at 80° C., using a Nara™ MSD-100 drying machine.

A plastisol-type PVC formulation is then prepared, comprising, in percentage of weight, 35,4% of Vestolit™ E 7031, 46,8% of diisononyl phthalate, 1,7% of Weisskalk™ Super 40, 1,1% of Euretek™ 505 and 15% of the mineral pigment according to the invention previously obtained.

The yield point of this composition, measured after 72 hours according to the methods well known by the skilled man in the art, is equal to 510 Pa.

Test n° 65

This test illustrates the invention and concerns a process to obtain the pigment according to the invention in which the treatment with 0,2% of a mixture of fatty acids takes place after the reaction of the calcium carbonate of marble type with the phosphoric acid.

To accomplish this, 0,694 kg (by weight of dry pigment) of natural calcium carbonate of the Norwegian marble type, of granulometry such that 65% by weight of the particles have a diameter of less than 1 μm, measured using the Sedigraph 5100 of the company Micromeritics™, in the form of an aqueous suspension of 78% of dry content, dispersed with 0,77% of a soda polyacrylate, is diluted until an aqueous suspension with a 65% by weight of dry matter is obtained, using distilled water, in the 10-litre ESCO™ reactor.

The suspension thus formed is then treated, at a temperature equal to 70° C., with 10% of a mixture of phosphoric acid and sulphuric acid in a 10% by weight solution, under stirring during 30 minutes.

Then, the obtained suspension is treated with 2% of fatty acids in suspension, consisting in a coco oil, based on stearic acid, acid having 10 carbon atoms, acid having 12 carbon atoms, acid having 14 carbon atoms, palmitic acid, acid having from 20 to 22 carbon atoms, with a CAS number equal to 67701-05-7.

After the addition of 136 g of calcium hydroxide of 14% by weight, the suspension has a pH equal to 9,7 and a percentage of dry solid content equal to 10,1%.

The suspension thus obtained is dried at 80° C., using a Narar™ MSD-100 drying machine.

A plastisol-type PVC formulation is then prepared, comprising, in percentage of weight, 25,0% of Vestolit™ E 7031, 33,0% of diisononyl phthalate, 1,2% of Weisskalk™ Super 40, 0,8% of Euretek™ 505 and 40,0% of the mineral pigment according to the invention previously obtained.

The yield point of this composition, measured after 72 hours according to the methods well known by the skilled man in the art, is equal to 502 Pa.

The invention claimed is:

1. A product obtained by a process consisting of the steps of:

(a) treating calcium carbonate, that is dispersed with a dispersing agent, in an aqueous suspension for 0.2 to 10 hours with the following consisting of:
  (i) phosphoric acid at a molar quantity, relative to the number of moles of calcium carbonate, of 0.001 to 1,
  (ii) gaseous $CO_2$ formed in situ and/or coming from an external supply, and
  (iii) one or more compounds of formula R—X at a molar quantity, relative to the number of moles of calcium carbonate, of 0.001 to 1, wherein the one or more compounds of formula R—X have 8 to 24 carbon atoms and are selected from the group consisting of linear fatty acids, ramified fatty acids, fatty amines, fatty alcohols, whether or not saturated, mixtures thereof, and their mixtures with synthetic or natural fatty compounds, to obtain an aqueous suspension of mineral pigment;

(b) optionally adjusting the pH of the aqueous suspension of mineral pigment by the addition of a base;

(c) optionally introducing at least one anionic or cationic electrolyte to the aqueous suspension of mineral pigment; and (d) optionally drying the aqueous suspension of mineral pigment obtained from step (a), step (b) and/or step (c), wherein the calcium carbonate in step (a) is selected from the group consisting of ground marble, calcite, chalk, dolomite and any mixture thereof.

2. The product according to claim 1, wherein in step (a) the calcium carbonate is treated for 0.2 to 6 hours.

3. The product according to claim 1, wherein the calcium carbonate is treated in part (i) with phosphoric acid at a molar quantity, relative to the number of moles of calcium carbonate, of 0.1 to 0.5.

4. The product according to claim 1, wherein in step (a) the calcium carbonate is treated at temperature of between 5° C. and 100° C.

5. The product according to claim 1, wherein in step (a) the calcium carbonate is treated at temperature of between 65° C. and 80° C.

6. The product according to claim 1, wherein the calcium carbonate is treated in part (iii) with one or more compounds of formula R—X at a molar quantity, relative to the number of moles of calcium carbonate, of 0.002 to 0.01.

7. The product according to claim 1, wherein the one or more compounds of formula R—X is a fatty acid.

8. The product according to claim 1, wherein the one or more compounds of formula R—X is a fatty amine.

9. The product according to claim 1, wherein the one or more compounds of formula R—X is a fatty alcohol.

10. The product according to claim 1, wherein the fatty acids, fatty amines, fatty alcohols and their mixtures are of the stearic, oleic, linoleic, myristic, or octylic type, or their mixtures.

11. The product according to claim 1, wherein the fatty acids, fatty amines, fatty alcohols, and their mixtures have 16 to 18 carbon atoms.

12. The product according to claim 1, wherein the natural fatty compound is of animal origin.

13. The product according to claim 1, wherein the natural fatty compound is of vegetal origin.

14. The product according to claim 1, wherein the natural fatty compound is tallow oil.

15. The product according to claim 1, wherein the one or more compounds of formula R—X is stearic acid.

16. The product according to claim 1, wherein the one or more compounds of formula R—X is a mixture of stearic acid and a fatty acid.

17. The product according to claim 1, wherein the one or more compounds of formula R—X is a mixture of palmitic acid and stearic acid.

18. The product according to claim 1, wherein the one or more compounds of formula R—X is a mixture of a fatty acid and a fatty alcohol.

19. The product according to claim 1, wherein the one or more compounds of formula R—X is a mixture of a vegetal oil-based fatty acid and stearilic acid.

20. The product according to claim 1, wherein the one or more compounds of formula R—X is a mixture of a vegetal oil-based fatty acid and dodecylic alcohol.

21. The product according to claim 1, wherein the one or more compounds of formula R—X is stearilic alcohol.

22. The product according to claim 1, wherein the one or more compounds of formula R—X is lauric acid or laurylic acid.

23. The product according to claim 1, wherein the one or more compounds of formula R—X is a mixture of fatty acids.

24. The product according to claim 1, wherein the one or more compounds of formula R—X is sunflower oil.

25. The product according to claim 1, wherein the one or more compounds of formula R—X is linseed oil.

26. The product according to claim 1, wherein the one or more compounds of formula R—X is coco oil.

27. The product according to claim 1, wherein the mineral pigment has a BET specific surface area of 1 $m^2/g$ to 200 $m^2/g$.

28. The product according to claim 1, wherein the mineral pigment has a BET specific surface area of 5 $m^2/g$ to 80 $m^2/g$.

29. The product according to claim 1, wherein the mineral pigment has a BET specific surface area of 20 $m^2/g$ to 60 $m^2/g$.

30. The product according to claim 1, wherein the mineral pigment has a median diameter of 0.1 to 50 micrometers.

31. The product according to claim 1, wherein the mineral pigment has a median diameter of 1 to 10 micrometers.

32. The product according to claim 1, having a moisture content of less than 1.50% after drying for 2 hours at 120° C. in an oven at atmospheric pressure.

33. The product according to claim 1, wherein step (b) is performed.

34. The product according to claim 1, wherein step (c) is performed.

35. The product according to claim 1, wherein step (d) is performed.

36. The product according to claim 1, wherein steps (b) and (c) are performed.

37. The product according to claim 1, wherein steps (c) and (d) are performed.

38. The product according to claim 1, wherein steps (b) and (d) are performed.

39. The product according to claim 1, wherein steps (b), (c) and (d) are performed.

* * * * *